(12) United States Patent
Tran et al.

(10) Patent No.: US 6,914,026 B2
(45) Date of Patent: Jul. 5, 2005

(54) HYDROTHERMALLY STABLE METAL PROMOTED ZEOLITE BETA FOR $NO_x$ REDUCTION

(75) Inventors: Pascaline H. Tran, Holmdel, NJ (US); Xinsheng Liu, Edison, NJ (US); James M. Chen, North Brunswick, NJ (US)

(73) Assignee: Engelhard Corporation, Iselin, NJ (US)

( * ) Notice: Subject to any disclaimer, the term of this patent is extended or adjusted under 35 U.S.C. 154(b) by 136 days.

(21) Appl. No.: 09/948,236

(22) Filed: Sep. 7, 2001

(65) Prior Publication Data

US 2003/0050182 A1 Mar. 13, 2003

(51) Int. Cl.$^7$ ............................................... B01J 29/06
(52) U.S. Cl. ............................ 502/66; 502/64; 502/65; 502/73; 502/74; 502/78; 502/79
(58) Field of Search ............................... 502/64, 65, 66, 502/73, 74, 78, 79

(56) References Cited

U.S. PATENT DOCUMENTS

| | | | | |
|---|---|---|---|---|
| 4,774,213 A | * | 9/1988 | Schneider et al. | ............ 502/81 |
| 4,961,917 A | | 10/1990 | Byrne | |
| 5,024,981 A | | 6/1991 | Speronella et al. | |
| 5,125,231 A | | 6/1992 | Patil et al. | |
| 5,164,350 A | | 11/1992 | Abe et al. | |
| 5,427,753 A | * | 6/1995 | Miura et al. | ............ 423/239.2 |
| 5,522,984 A | | 6/1996 | Gadja et al. | |
| 5,589,147 A | * | 12/1996 | Farnos et al. | ............ 423/239.2 |
| 5,695,728 A | * | 12/1997 | Miura et al. | ............ 423/239.2 |
| 5,776,423 A | * | 7/1998 | Feeley et al. | ............ 423/239.2 |
| 6,033,641 A | * | 3/2000 | Hall et al. | ............ 423/239.2 |
| 6,143,681 A | * | 11/2000 | Sachtler et al. | ............ 502/74 |
| 6,171,556 B1 | | 1/2001 | Burk et al. | |
| 2003/0108467 A1 | * | 6/2003 | Tran et al. | ............ 423/239.2 |

FOREIGN PATENT DOCUMENTS

WO        WO 02/41991 A2      5/2002      ............ B01J/29/00

OTHER PUBLICATIONS

"Progress Toward Understanding Zeolite B Acidity : An IR and 27A1 NMR Spectroscopic Study" by Kiricsi, etal, J. Phys. Chem., 1994, 98, 4627–4634.

"Mechanisms of Formation of Extraframework, $Al_2$ 03 in Zeolites" by Alvarez, et al., Elsevier Science, Inc., 1997.

He, et al. "Fe–containing mesoporous molecular sieves materials: very active Friedel–Crafts alkylation catalysts" Applied Catalysis A: General, Elsevier Science, Amsterdam, NL, vol. 169, No. 1, Apr. 17, 1998, pp. 29–36.

Chen, et al. "Reduction of NOx over various Fe/zeolite catalysts:" Applied Catalysis A: General, Elsevier Science, Amsterdam, NL, vol. 194–195, Mar. 13, 2000, pp. 159–168.

* cited by examiner

*Primary Examiner*—Christina Johnson
(74) *Attorney, Agent, or Firm*—Richard A. Negin

(57) ABSTRACT

The present invention is directed to an iron-promoted zeolite beta catalyst useful in the selective catalytic reduction of nitrogen oxides with ammonia in which the iron-promoted zeolite beta is treated so as to provide increased amounts of the iron promoter in the form of Fe(OH).

The stabilized zeolite is formed by cation exchange of an iron salt into a zeolite beta which has a reduced sodium content such as by exchanging a sodium beta with ammonium or hydrogen cations. A zeolite beta having a reduced carbon content and a Si/Al ratio of no more than 10 also increases the Fe(OH) content of the iron-promoted catalyst. The iron-promoted catalyst which has the iron in the form of Fe(OH) is characterized by a peak at $3680\pm5$ cm$^{-1}$ in the IR spectra.

45 Claims, 3 Drawing Sheets

HYDROTHERMALLY STABLE METAL PROMOTED ZEOLITE BETA FOR NO$_x$ REDUCTION

BACKGROUND OF THE INVENTION

1. Field of the Invention

The present invention is concerned with a method of catalyzing the reduction of nitrogen oxides with ammonia, especially the selective reduction of nitrogen oxides, with ammonia in the presence of oxygen, using zeolite catalysts, especially metal-promoted zeolite catalysts. The invention is also directed to hydrothermally stable zeolite catalysts and methods of making same.

2. The Related Art

Both synthetic and natural zeolites and their use in promoting certain reactions, including the selective reduction of nitrogen oxides with ammonia in the presence of oxygen, are well known in the art. Zeolites are aluminosilicate crystalline materials having rather uniform pore sizes which, depending upon the type of zeolite and the type and amount of cations included in the zeolite lattice, range from about 3 to 10 Angstroms in diameter.

Japanese Patent Publication (Kokai) No. 51-69476, published Jun. 16, 1976 on Application No. 49-142463, filed Dec. 13, 1974, discloses a method for reducing nitrogen oxides in waste gases by reaction with ammonia in the presence of a metal-promoted, dealuminized synthetic or natural mordenite zeolite. The resistance of the catalyst to sulfurous poisons, particularly sulfur trioxide and sulfuric acid mist, is said to be enhanced by dealuminizing the mordenite to increase the silica to alumina ratio to more than 12, preferably to more than 15. The zeolite is promoted with 0.5 to 30 wt. % of at least one of a number of promoters including copper, vanadium, chromium, iron, cobalt or nickel and used at a reaction temperature of 200° C. to 500° C. with from 0.5 to three times the stiochiometric amount of ammonia reductant. Example 1 of the Publication illustrates an iron-promoted mordenite ore as being effective for the reduction of nitrogen oxides. In connection with Example 2, it is stated that a slight decrease of the activity of a high silica to alumina ratio, copper-promoted mordenite catalyst is recognized when sulfur trioxide is included in the gas stream. However, an "extreme improvement" of resistance to sulfur trioxide poisoning is noted in comparison with a copper mordenite which has not been dealuminized to increase the silica to alumina ratio.

UK Patent Application No. 2,193,655A discloses a catalyst containing a low surface area titania and a copper-promoted zeolite for use in the reduction of nitrogen oxides with ammonia. The zeolite has an average pore diameter of 10 Angstroms or less, preferably 8 Angstroms or less, and a silica to alumina molar ratio of 10 or more, preferably 20 or more; the resultant titania/-promoted zeolite catalysts having these characteristics are stated to have good mechanical strength and to be resistant to volatile catalyst poisons such as arsenic, selenium, tellurium, etc., contained in exhaust gases. Examples of suitable zeolites are mordenite, ZSM-5, and ferrierite.

U.S. Pat. No. 4,297,328 discloses a "three-way conversion" catalytic process for the simultaneous catalytic oxidation of carbon monoxide and hydrocarbons and reduction of nitrogen oxides for purifying the exhaust gas of automobile engines operated within a prescribed range of air to fuel ratio (column 4, lines 63–68). The disclosed catalyst is a copper-promoted zeolite having a silica to alumina ratio greater than 10, preferably greater than 20 (column 6, lines 23–28). Representative high-silica zeolites are described at columns 6–8 of the patent and include (column 6, lines 29–33) silicalite (as described in U.S. Pat. No. 4,061,724), ZSM-8, ZSM-11, ZSM-12, hyper Y, ultrastabilized Y, Beta, mordenite and erionite. Ultrastabilized Y is described (column 7, lines 22–25) as "a form of zeolite Y which has been treated to give it the organophilic characteristic of the adsorbents of the present invention." Example 6 of the patent is stated to show no measurable loss in combustion activity of the copper-promoted zeolite catalyst due to sulfur poisoning (exposure of the catalyst to methylmercaptan in the gaseous stream). The patent thus discloses the utility of the copper-promoted specified zeolites for three-way conversion in an exhaust gas generated by a lean air to fuel ratio combustion mixture.

The art thus shows an awareness of the utility of metal-promoted zeolite catalysts including, among others, iron-promoted and copper-promoted zeolite catalysts, for the selective catalytic reduction of nitrogen oxides with ammonia.

In accordance with U.S. Pat. No. 4,961,917, there is provided an improved method for the reduction of nitrogen oxides with ammonia. The method described in this commonly assigned U.S. patent comprises the following steps. A gaseous stream containing nitrogen oxides and ammonia, and which may also contain oxygen, is contacted at a temperature of from about 250° C. to 600° C. with a sulfur-tolerant catalyst composition. The catalyst composition comprises a zeolite having a silica to alumina ratio of at least about 10, and a pore structure which is interconnected in all three crystallographic dimensions by pores having an average kinetic pore diameter of at least about 7 Angstroms, e.g. from about 7 to 8 Angstroms, and one or both of an iron and a copper promoter present in the zeolite, for example, in the amount of from about 0.1 to 30 percent by weight, preferably from about 1 to 5 percent by weight, of the total weight of promoter plus zeolite. The zeolite comprises one or more of USY, Beta and ZSM-20. A refractory binder may be admixed with the zeolites. An iron-promoted zeolite beta is preferred and has been commercialized for removing NO$_x$ by selective catalytic reduction such as from gas turbine exhaust.

The iron-promoted zeolite beta has been an effective catalyst for the selective reduction of nitrogen oxides such as by the reduction of nitrogen oxides with ammonia. Unfortunately, it has been found that under harsh hydrothermal conditions, such as reduction of NO$_x$ from gas turbine exhaust at temperatures exceeding 500° C., the activity of the iron-promoted zeolite beta begins to decline. This decline in activity is believed to be due to destabilization of the zeolite such as by dealumination and consequent reduction of metal-containing catalytic sites within the zeolite. To maintain the overall activity of NO$_x$ reduction, increased levels of the iron-promoted zeolite catalyst must be provided. As the levels of the zeolite catalyst increase so as to provide adequate NO$_x$ removal, there is an obvious reduction in the cost efficiency of the process for NO$_x$ removal as the costs of the catalyst rise.

In copending, commonly assigned U.S. patent application Ser. No. 09/712,210, filed Nov. 15, 2000, improvements in the hydrothermal stability of aluminosilicate zeolite NO$_x$ reduction catalysts are described. In particular, stabilized aluminosilicate zeolites are provided by incorporating into the zeolite structure extra-framework aluminum oxide chains, which are believed to be associated with or even linked to the aluminosilicate framework of the zeolite. The presence of the extra-framework aluminum oxide chains is manifest by a unique peak found in the FT-IR spectrum. The presence of this peak at 3781±5 cm$^{-1}$ is associated with the improved stability of the zeolite. The extra-framework aluminum oxide chains can be incorporated into the zeolite structure by several processes known at this time, including via a unique steaming regimen or by treatment with rare earth metals, such as cerium. While not wishing to be bound by any theory, it is believed that the treatment of the aluminosilicate zeolite decouples aluminum oxide temporarily from the zeolitic framework. The decoupled aluminum oxide molecules are then recombined and linked as a chain, which is reattached to or otherwise associated with the zeolite framework. The treatment process is unlike well-known methods of dealuminizing zeolites for the purpose of increasing the silica to alumina ratio. In the present invention, the alumina is not removed from the zeolite but is believed to be rearranged and otherwise attached or associated with the aluminosilicate framework. The extra-framework aluminum oxide chains associated with the FT-IR absorption peak at 3781±5 cm$^{-1}$ appear to stabilize the zeolite against further dealumination such as under oxidizing and harsh hydrothermal conditions.

There is still a need, however, to improve the process for the selective catalytic reduction of NO$_x$ by ammonia so as to maintain catalytic activity, even under harsh hydrothermal conditions.

There is a further general need for improving the hydrothermal stability of aluminosilicate zeolite catalysts, especially metal-promoted zeolites so as to stabilize such materials from dealumination and loss of catalytic sites during use.

SUMMARY OF THE INVENTION

In accordance with the present invention, aluminosilicate zeolites are provided with improved hydrothermal stability and, in particular, improved hydrothermal stability for catalyzing the reduction of nitrogen oxides with ammonia, by increasing the Fe(OH) content of the catalyst. The improved iron-containing aluminosilicate zeolite catalysts of this invention are characterized by the presence of a significant Fe(OH) peak at about 3680 cm$^{-1}$ of the IR spectra. It has been found that the higher the Fe(OH) peak found in the IR spectra of the catalyst, the greater is the improvement in aged catalyst activity. It has further been found that the activity variations of the iron-promoted zeolites could not be correlated to the total amount of exchanged iron as determined by UV analysis. Thus, it is evident that the location of the exchanged iron plays a significant role in providing the catalyst activity for the reduction of NO$_x$ even after hydrothermal aging. The exchanged iron at the Fe(OH) location provides vastly increased stability and consequently long-term catalytic reduction activity.

It has been further been found that iron-containing aluminosilicate zeolite catalysts having the extra-framework aluminum oxide as disclosed in commonly assigned, copending U.S. application Ser. No. 09/712,210 can be provided with improved stability by also increasing the Fe(OH) content of the catalyst. Methods of increasing the Fe(OH) content of the iron-containing catalyst involves removing residual sodium by acid or salt treatment to less than 500 ppm prior to iron exchange and as well, adjusting the calcination conditions to essentially remove organic zeolite templates and coke.

DETAILED DESCRIPTION OF THE INVENTION

Figure 1:
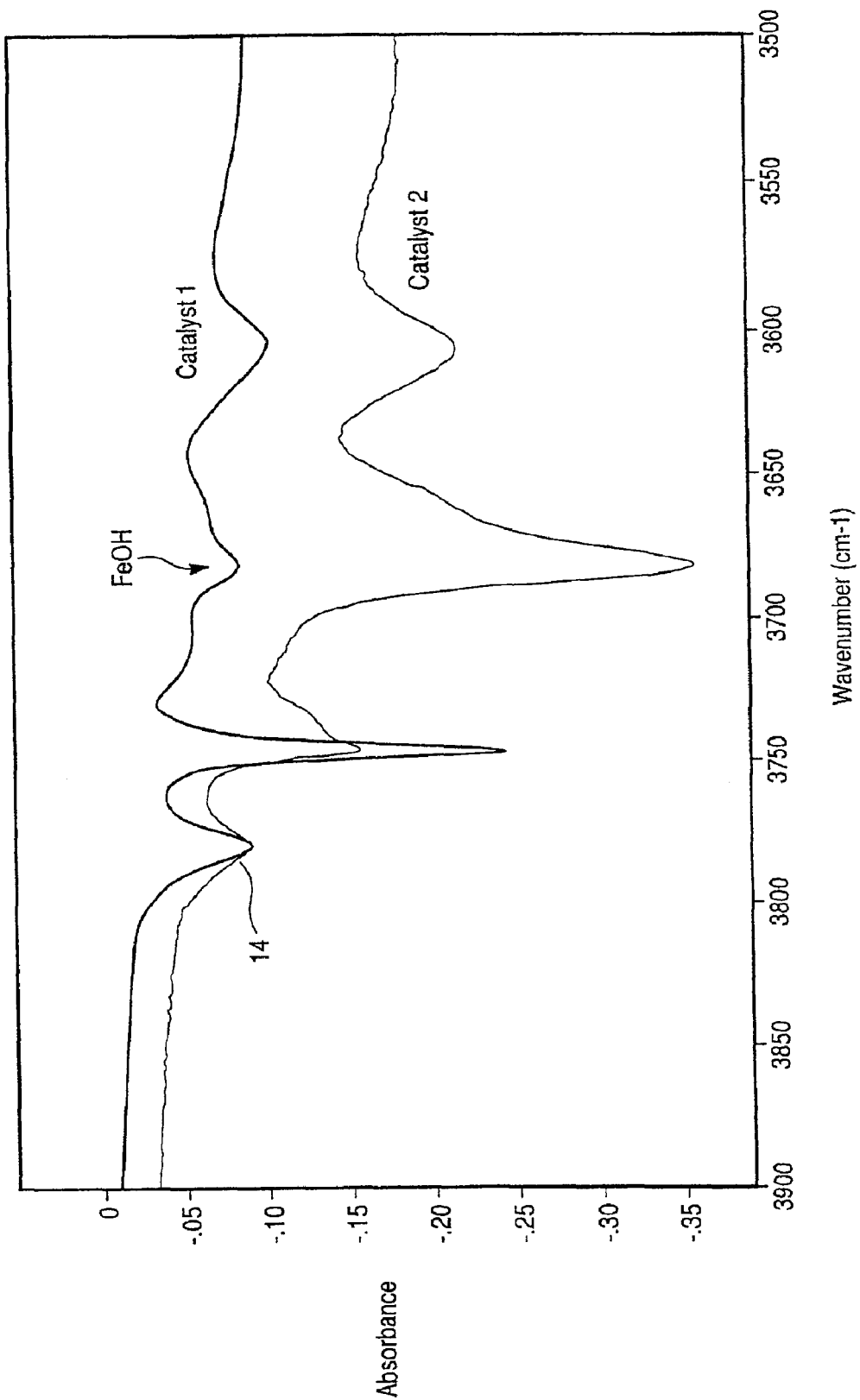
FIG. 1 is a comparison of IR spectras of iron-containing zeolite beta catalysts formed in accordance with the present invention, but having different Si/Al ratios.

In order to reduce the emissions of nitrogen oxides from flue and exhaust gases, such as the exhaust generated by gas turbine engines, ammonia is added to the gaseous stream containing the nitrogen oxides and the gaseous stream is then contacted with a suitable catalyst at elevated temperatures in order to catalyze the reduction of nitrogen oxides with ammonia. Such gaseous streams often inherently contain substantial amounts of oxygen. For example, a typical exhaust gas of a turbine engine contains from about 2 to 15 volume percent oxygen and from about 20 to 500 volume parts per million nitrogen oxides, the latter normally comprising a mixture of NO and NO$_2$. Usually, there is sufficient oxygen present in the gaseous stream to oxidize residual ammonia, even when an excess over the stoichiometric amount of ammonia required to reduce all the nitrogen oxides present is employed. However, in cases where a very large excess over the stoichiometric amount of ammonia is utilized, or wherein the gaseous stream to be treated is lacking or low in oxygen content, an oxygen-containing gas, usually air, may be introduced between the first catalyst zone and the second catalyst zone, in order to insure that adequate oxygen is present in the second catalyst zone for the oxidation of residual or excess ammonia. The reduction of nitrogen oxides with ammonia to form nitrogen and H$_2$O can be catalyzed by metal-promoted zeolites to take place preferentially to the oxidation of ammonia by the oxygen, hence the process is often referred to as the "selective" catalytic reduction ("SCR") of nitrogen oxides, and is sometimes referred to herein simply as the "SCR" process.

The catalysts employed in the SCR process ideally should be able to retain good catalytic activity under high temperature conditions of use, for example, 400° C. or higher, under hydrothermal conditions and in the presence of sulfur compounds. High temperature and hydrothermal conditions are often encountered in practice, such as in the treatment of gas turbine engine exhausts. The presence of sulfur or sulfur compounds is often encountered in treating the exhaust gases of coal-fired power plants and of turbines or other engines fueled with sulfur-containing fuels such as fuel oils and the like.

Theoretically, it would be desirable in the SCR process to provide ammonia in excess of the stoichiometric amount required to react completely with the nitrogen oxides present, both to favor driving the reaction to completion and to help overcome adequate mixing of the ammonia in the gaseous stream. However, in practice, a significant excess of ammonia over the stoichiometric amount is normally not provided because the discharge of unreacted ammonia from the catalyst would itself engender an air pollution problem. Such discharge of unreacted ammonia can occur even in cases where ammonia is present only in a stoichiometric or sub-stoichiometric amount, as a result of incomplete reaction and/or poor mixing of the ammonia in the gaseous stream. Channels of high ammonia concentration are formed in the gaseous stream by poor mixing and are of particular concern when utilizing catalysts comprising monolithic honeycomb-type carriers comprising refractory bodies having a plurality of fine, parallel gas flow paths extending therethrough because, unlike the case with beds of particulate catalysts, there is no opportunity for gas mixing between channels. It is, therefore, also desirable that the catalyst employed to catalyze the selective catalytic reduction of nitrogen oxides, be effective to catalyze the reaction of oxygen and ammonia, in order to oxidize excess or unreacted ammonia to $N_2$ and $H_2O$.

Commonly assigned U.S. Pat. No. 4,961,917 is predicated on the discovery that a certain class of zeolites, especially when promoted with a promoter such as iron or copper, especially iron, exhibits desired characteristics as described above by providing a sulfur tolerant catalyst which shows good activity for both (1) the selective catalytic reduction of nitrogen oxides by reaction with ammonia, even in the presence of oxygen, and (2) the oxidation of ammonia with oxygen when nitrogen oxides are at very low concentrations. The catalysts disclosed in the above referenced patent retain such activity even after prolonged exposure to high temperatures, hydrothermal conditions, and sulfate contamination of the type often encountered in use, e.g., in the treatment of coal-fired power plants or turbine engine exhaust gases.

Generally, in accordance with the practices of the present invention and as disclosed in U.S. Pat. No. 4,961,917, a catalyst is provided which comprises a zeolite having specific properties as described below, and which is promoted by a metal, preferably iron, in order to enhance its catalytic activity. The zeolite may be provided in the form of a fine powder which is admixed with or coated by a suitable refractory binder, such as bentonite or silica, and formed into a slurry which is deposited upon a suitable refractory carrier. Typically, the carrier comprises a member, often referred to as a "honeycomb" carrier, comprising one or more refractory bodies having a plurality of fine, parallel gas flow passages extending therethrough. Such carriers are, of course, well known in the art and may be made of any suitable material such as cordierite or the like. The catalysts of the present invention may also be provided in the form of extrudates, pellets, tablets or particles of any other suitable shape, for use as a packed bed of particulate catalyst, or as shaped pieces such as plates, saddles, tubes, or the like.

Useful catalysts show a marked resistance to poisoning by sulfates (or other sulfur compounds) which are often contained in the gas streams which are treatable by the catalysts of the present invention. Without wishing to be bound by any particular theory, it appears that $SO_2$ poisoning has both short term and long term effects. For example, flowing a gas stream containing 2,000 parts per million by volume ("Vppm") $SO_2$ through catalysts comprising copper-promoted small to medium pore zeolites such as ZSM-5, naturally occurring chabazite and clinoptilolite, resulted in 10 to 40 percent reduction in SCR process activity. Even at $SO_2$ levels as low as 130 Vppm $SO_2$, significant activity reduction for the SCR process was noted for such catalysts. On the other hand, larger pore zeolites such as Y, L and USY exhibited no short-term $SO_2$ susceptibility. With operating temperatures at about 350° C., the short-term $SO_2$ poisoning effect on a copper-promoting mordenite was shown to be reversible. Thus, when the supply of $SO_2$ to the test gas stream passing through the copper-promoted mordenite catalyst was turned off, the activity for catalytic reduction of NO immediately returned to the same level attained by the catalyst prior to introducing the $SO_2$. Apparently, $SO_2$ is absorbed, but not tightly bound in the zeolite pores. In the case of the small to medium pore zeolites, this competition absorption with $NH_3$ and NO probably results in a physical blockage and/or diffusional restriction.

On the other hand, when zeolite catalysts are subjected to higher $SO_2$ concentrations for longer periods of time, such as 5,000 Vppm $SO_2$ for protracted periods, such as overnight, a 15 to 25 percent activity reduction for the SCR process was noted for copper-promoted, synthetic iron-free zeolites. A 60 percent reduction in SCR process activity is typical for $Fe_2O_3$ containing natural chabazite. Similar results were sustained with iron-promoted mordenite catalysts.

Even at lower levels of $SO_2$ concentration, similar to those likely to be encountered in commercial operations, a permanent activity loss for the SCR process is shown by many zeolite catalysts. For example, a copper-promoted mordenite catalyst was subjected overnight to passage through it of a gaseous stream containing 540 Vppm $SO_2$, and showed a permanent activity loss comparable to that described above for the catalysts subjected to the 5,000 Vppm $SO_2$-containing gas.

For zeolites with silica-alumina ratios of less than 8, the activity loss appears to be associated with insufficient stability under the simulated acidic aging conditions. As indicated by the prior art noted above, the utilization of high ratios of silica to alumina is known to enhance acid resistance of the zeolite and to provide enhanced resistance of the zeolite to acid sulfur poisoning. Generally, silica to alumina ratios well in excess of the minimum of 8 may be employed. Conversion efficiencies of 90 to 93% for $NO_x$ reduction with ammonia have been attained with fresh copper-promoted Beta zeolites having silica to alumina ratios of 20, 26, 28, 37 and 62. A conversion efficiency of 77% was attained by a fresh copper-promoted ZSM-5 zeolite having a silica to alumina ratio of 46. However, fresh copper-promoted USY zeolites with silica to alumina ratios of, respectively, 8 and 30 provided 85% and 39% conversions of $NO_x$ suggesting that at least for USY, silica to alumina ratios should be significantly less than 30.

However, resistance to short term sulfur poisoning and the ability to sustain a high level of activity for both the SCR process and the oxidation of ammonia by oxygen has been found to be provided by zeolites which also exhibit pore size large enough to permit adequate movement of the reactant molecules NO and $NH_3$ in to, and the product molecules $N_2$ and $H_2O$ out of, the pore system in the presence of sulfur oxide molecules resulting from short term sulfur poisoning and/or sulfate deposits resulting from long term sulfur poisoning. The pore system of suitable size is interconnected in all three crystallographic dimensions. As is well known to those skilled in the zeolite art, the crystalline structure of zeolites exhibits a complex pore structure having more or less regularly recurring connections, intersections and the like. Pores having a particular characteristic, such as a given dimension diameter or cross-sectional configuration, are said to be one dimensional if those pores do not intersect with other like pores. If the pores intersect only within a given plane with other like pores, the pores of that characteristics are said to be interconnected in two (crystallographic) dimensions. If the pores intersect with other like pores lying both in the same plane and in other planes, such like pores are said to be interconnected in three dimensions, i.e., to be "three dimensional". It has been found that zeolites which are highly resistant to sulfate poisoning and provide good activity for both the SCR process and the oxidation of ammonia with oxygen, and which retain good activity even when subject to high temperatures, hydrothermal conditions and sulfate poisons, are zeolites which have pores which exhibit a pore diameter of at least about 7 Angstroms and are interconnected in three dimensions.

Without wishing to be bound by any specific theory, it is believed that the interconnection of pores of at least 7 Angstroms diameter in three dimensions provides for good mobility of sulfate molecules throughout the zeolite structure, thereby permitting the sulfate molecules to be released from the catalyst to free a large number of the available adsorbent sites for reactant $NO_x$ and $NH_3$ molecules and reactant $NH_3$ and $O_2$ molecules. Any zeolites meeting the foregoing criteria are suitable for use in the practice of the present invention; specific zeolites which meet these criteria are USY, Beta and ZSM-20. Other zeolites may also satisfy the aforementioned criteria.

The above-described zeolite catalysts have been very effective for the selective catalytic reduction of $NO_x$ with ammonia. In particular, an iron-promoted zeolite beta has been found most useful in the SCR process for removing $NO_x$ from gas turbine exhaust streams. Unfortunately, at the higher temperatures, e.g. 500° C. or more, provided by recent gas turbine technology, it has been found that the hydrothermal stability of such catalyst is reduced as manifest by a reduced catalytic activity over time. Thus, the present invention is directed to improving the stability of catalysts described in U.S. Pat. No. 4,961,917 for use in SCR processing.

Importantly, a further discovery has been made which is believed to be relevant to hydrothermal stability of all zeolite catalysts. A novel zeolite structure has been found which is more resistant to dealumination such as under oxidizing or hydrothermal conditions and the like. Thus, while the treatment of zeolite beta to improve stability is a preferred embodiment of the invention inasmuch as such zeolite catalyst has been proven to be effective in the SCR process, an improvement in stability under oxidizing and/or hydrothermal conditions for any zeolite catalyst is now possible. The improvement in stability is provided by incorporating extra-framework aluminum oxide units into a zeolite catalyst. This improvement is disclosed in aforementioned U.S. application Ser. No. 09/712,210, filed Nov. 15, 2000, the entire contents of which are herein incorporated by reference. The extra-framework aluminum oxide units should be present in amounts of at least 10 wt. % relative to total aluminum oxide content in the zeolite to provide the desired stability. Examples of zeolite catalysts which can be treated to provide the extra-framework aluminum oxide include but are not so limited to ZSM-5, ZSM-8, ZSM-11, ZSM-12, zeolite X, zeolite Y, beta, mordenite, erionite.

The improved stability provided to aluminosilicate zeolites has so far been achieved by two distinct processes. In the first process, the zeolite is presteamed under specific conditions prior to the inclusion of the metal promoters. The zeolite to be presteamed can be in the hydrogen, ammonium, or metal cationic form other than the sodium form. It has been found that the sodium form ($Na^+$) of the zeolite will not form the extra-framework aluminum oxide by either of the disclosed treatments. The steaming conditions are such as to provide improved resistance to dealumination during use under high temperature, oxidizing conditions, and harsh hydrothermal environments. It is believed that the steaming conditions are such as to provide the extra-framework aluminum oxide chains and are not such as to merely dealuminate the zeolite so as to increase the silica to alumina ratio.

Accordingly, zeolite beta can be provided with improved stability for catalyzing the selective catalytic reduction of $NO_x$ with ammonia by pre-steaming the catalyst at temperatures of greater than 600° C. to 800° C. for a period of time of 0.25 to 8 hours. The preferred steam temperature is 650° C. to 750° C. The length of the pre-steaming treatment is preferably from 0.5 to 4 hours and most preferably from 1 to 2 hours. The temperatures for the steaming treatment are generally lower than those used for removing aluminum from the framework of zeolites, and the length of treatment is generally shorter than that usually provided for dealumination of the zeolite framework. Steaming conditions used to provide stability for other aluminosilicate zeolites other than zeolite beta should be similar to the conditions set forth. Such conditions can be readily determined by steaming the zeolite at conditions such as to provide the peak at 3781±5 $cm^{-1}$ observed by FT-IR.

Subsequent to the steaming treatment, the zeolite can be promoted with various metals. For the use of zeolite beta as in the selective catalytic reduction of $NO_x$ with ammonia, the pre-steamed zeolite beta can be promoted with iron and copper as described in U.S. Pat. No. 4,961,917, the entire contents of which are herein incorporated by reference. In general, the iron or copper promoter, iron being preferred, is added in amounts of from about 0.1 to 30% by wt. calculated as metal based on the total weight of the metal and the zeolite. Preferred levels of the iron promoter ranges from 0.5 to 2.5 wt. %, and most preferred from about 0.7 to 1.5 wt. %.

The second method which has been found to provide zeolite beta with hydrothermal stability during the selective catalytic reduction of $NO_x$ with ammonia is to pre-treat the zeolite beta with a compound of the lanthanide series, such as cerium, prior to exchange with the promoter metal such as iron. Again, it is theorized that the lanthanide being slightly acidic results in the scission of the aluminum oxide from the zeolite framework which aluminum oxide is then recombined as aluminum oxide chains, which are linked to or associated with the zeolite framework. The lanthanides such as cerium are not so acidic as to cause the complete dealumination and removal of the aluminum oxide from the zeolite. In the lanthanide exchange, an aqueous solution of a lanthanide salt at a pH of 2 to 4 is first exchanged into a hydrogen or ammonium zeolite beta to provide a level of lanthanide of approximately 0.25 to 1 wt. % on the zeolite. A metal cationic form other than sodium can also be treated with the lanthanide salt. Subsequent exchange with the metal promoter such as iron is achieved by conventional methods by use of an aqueous metal salt to provide the level of metal promoter as described above. Again, although improved stability has been found with zeolite beta when used to catalyze the selective catalytic reduction of $NO_x$ with ammonia, it is believed that stability for other zeolite catalysts can be achieved inasmuch as the treatment with the lanthanide such as cerium provides the extra framework aluminum oxide chains and consequent increased resistance to dealumination under high temperature, oxidizing or hydrothermal environments.

Figure 2:
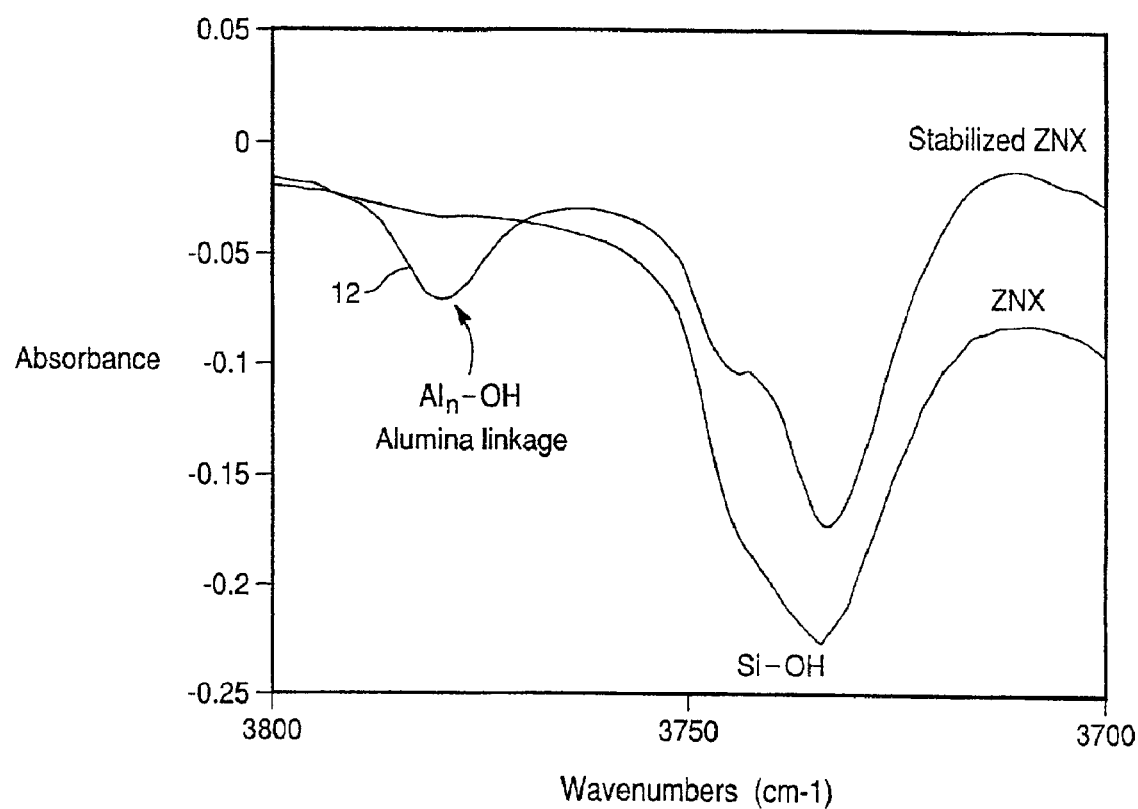
FIG. 2 is a comparison of IR spectra of a stabilized zeolite containing extra-framework aluminum and a standard zeolite beta.

Regardless of the exact association of the aluminum oxide chain to the zeolite framework, the extra-framework aluminum oxide chains have been found to have a characteristic FT-IR adsorption peak at 3781±5 $cm^{-1}$. This characteristic peak 12 is shown in FIG. 2 for zeolite beta, which has either been pre-steamed or which has been exchanged with cerium under acidic conditions. The FT-IR absorption band at 3781 $cm^{-1}$ is a characteristic of extra-framework aluminum in the zeolite beta, but is not present in FT-IR of untreated or dealuminized zeolite beta, (ZNX)see FIG. 2. Moreover, a zeolite beta which has been pretreated by exchange with aluminum cations or by the incorporation of aluminum oxide such as by slurry into the pores of the zeolite also do not show the characteristic absorption FT-IR band which is believed to represent extra framework aluminum oxide units linked to or otherwise associated with the aluminosilicate framework found with the stabilized zeolites. Importantly, to provide the enhanced stability, the FT-IR peak at 3781 cm$^{-1}$ should have a peak height of at least 0.05 absorbance unit, preferably at least 0.1 absorbance unit, and, most preferably, at least 0.2 absorbance unit.

In accordance with the present invention, it has been found that with respect to iron-promoted aluminosilicate zeolite catalysts, the hydrothermal stability of such catalysts can also be increased by increasing the Fe(OH) content of the catalyst. The presence of the iron-promoter in the form of Fe(OH) and the level of same can be measured by IR. The Fe(OH) peak manifests itself at 3680±5 cm$^{-1}$ in the IR spectra. It has been found that improvement in hydrothermal stability, i.e. aged activity, increases as the Fe(OH) peak in the IR spectra increases. FIG. 1 shows the IR spectra of iron-promoted zeolite beta catalysts of differing Si/Al ratios treated in accordance with this invention to increase Fe(OH) content. IR peak height at 3680 cm$^{-1}$ should be at least 0.02 absorbance unit, preferably at least 0.10 absorbance unit, and most preferably at least 0.20 absorbance unit to provide the desired improvement in heat aged activity.

While it is believed that hydrothermal stability and, thus, heat aged activity of any iron-promoted aluminosilicate zeolite catalyst can be improved by increasing the Fe(OH) content of the catalyst, the invention is most preferably used in improving the heat aged activity of catalysts useful in the SCR process for removing $NO_x$ emissions such as, for example, from gas turbine exhaust streams. Such useful catalysts have been described previously and are preferably exemplified by USY, beta and ZSM-20. An iron-promoted zeolite beta is most preferred.

Methods for increasing the level of Fe(OH) in the iron-promoted aluminosilicate zeolite include removing the residual sodium cation content prior to exchange with the iron promoter. Thus, it has been found that by reducing the sodium content to less than 500 ppm, preferably to less than 300 ppm, prior to iron exchange, increases in the amount of iron in the form of Fe(OH) can be provided. Removal of the residual sodium cations from the aluminosilicate zeolite catalyst can be readily achieved by treatment with acid or salt solutions prior to iron exchange. For example, treatment of the aluminosilicate zeolite in the sodium form with ammonium cations ($NH_4^+$) or by acids ($H^+$) such as nitric acid replaces the sodium cations with the ammonium or hydrogen cations, respectively. Subsequent to exchange and removal of the sodium ions, the aluminosilicate zeolite can be treated with an iron salt to incorporate the iron cationic species as is disclosed in aforementioned U.S. Pat. No. 4,961,917 and as is well-known.

It has also been found that increased levels of Fe(OH) can be achieved by removing the carbon content of the aluminosilicate zeolites. Many aluminosilicate zeolites, including zeolite beta, are formed using organic templates. Upon calcination of the zeolite to the active form, much of the organic template is vaporized. Small amounts of organic template are converted to carbon in the form of coke. Reducing the carbon content of the aluminosilicate zeolite, including removal of any residual organic template and the coke to levels of carbon of no more than 500 ppm, preferably to levels of 300 ppm or less, increases the Fe(OH) content as illustrated by a higher peak at 3680 cm$^{-1}$ in the IR spectra. Thus, calcination of the zeolite prior to iron exchange can be adjusted to ensure removal of the organic template and residual carbon content to the desired level.

Still another way to increase the Fe(OH) content of an iron-promoted aluminosilicate zeolite, in particular, iron-promoted zeolite beta, is to provide the zeolite beta with a Si/Al ratio (SAR) of 10 or below. Typically, zeolite beta is formed with a Si/Al ratio of from about 8 to 20. By forming the zeolite beta with Si/Al ratios of 10 or below, it has been found that the Fe(OH) content of an iron-promoted zeolite beta is increased. This is shown in Example 5 below and FIG. 1.

The present invention is also directed to further increasing the heat aged stability of iron-promoted aluminosilicate zeolite catalysts which contain extra-framework alumina as disclosed in aforementioned, commonly assigned, copending application U.S. Ser. No. 09/712,210. Thus, by increasing the Fe(OH) content of the iron promoter, aluminosilicate zeolites containing extra framework aluminum can be provided with additional resistance to hydrothermal aging. For SCR processes and $NO_x$ reduction, it is preferred to treat the iron-promoted aluminosilicate zeolite catalyst so as to provide both the extra-framework alumina and as well increase the Fe(OH) content of the iron promoter. In this aspect of the invention, the formation of the extra-framework alumina would occur after the aluminosilicate zeolite has been treated to reduce the sodium content to the desired level of below 500 ppm. As has been stated in the previous application, the formation of extra-framework alumina by steam treatment does not occur if the catalyst is in the sodium form. Subsequent to the removal of sodium, iron exchange and then steam treatment to form extra-framework aluminum would take place. Alternatively, after removal of sodium, lanthanide treatment, e.g. cerium exchange, and subsequent iron exchange can take place to also provide the extra-framework aluminum and increased Fe(OH) content.

The following examples are for the purpose of illustrating the invention only are not to be construed as strictly limiting the claimed invention to the embodiments exemplified.

EXAMPLE 1

Preparation of a standard iron-promoted beta zeolite (SAR 17.5:1), catalyst (ZNX) was as follows:

1. To 1,000 g of deionized water (heated to 80° C.) was added 25.5 g of $FeSO_4.H_2O$.

2. To this solution was added 212.5 g of $Na^+$ beta.

3. The slurry in step 2 was kept with continued stirring at 80° C. for one hour, then filtered through a filter press and washed with an additional 2,000 g of water.

EXAMPLE 2

Preparation of a low sodium beta zeolite (SAR 17.5:1) promoted with cerium/iron was as follows:

1. 200 g of beta zeolite was dispersed in one liter of a one molar nitric acid solid, stirred for five hours, then filtered and washed with 2 liters of deionized water.

2. The mixture was then dried and calcined at 650° C. for one hour to burn off carbon.

3. The calcined beta was added to 2 liters of a 0.05 molar cerium nitrate solution at pH 4 and stirred for twenty-four hours, filtered and washed with 4 liters of deionized water.

4. The filter cake from step 3 was added to 2 liters of 0.05 molar $FeCl_2$ solution, stirred for twenty-four hours, dried and washed with 4 liters of deionized water.

5. The filter cake was then dried and calcined at 600° C. for six hours. The final product contained about 0.7% $CeO_2$ and 1.4% $Fe_2O_3$.

EXAMPLE 3

Preparation of beta zeolite (SAR 10:1) promoted with cerium/iron:

1. A cerium/iron promoted $NH_4^+$ beta zeolite (SAR of 10:1 was prepared following steps 3 to 5 in Example 2.
2. The final product contained about 0.91% $CeO_2$ and 2.05% $Fe_2O_3$.

EXAMPLE 4

The catalysts from Examples 1–3 were measured by IR and for catalyst activity after aging in 30% steam at 650° C. for 250 hours. Catalyst activity was determined by measuring $NO_x$ conversion across the catalyst at the conditions of 430° C., 60,000/hr Space Velocity. The feed gas contained 200 ppm $NO_x$, 200 ppm $NH_3$, 10% $H_2O$ and 10% $O_2$. Results are shown in Table 1.

TABLE 1

|  | Fe (OH) peak intensity | Aged activity after 250 hours aging at 650° C. and 30% steam |
| --- | --- | --- |
| Example 1 | 0 | 60% |
| Example 2 | 0.11 | 75% |
| Example 3 | 0.23 | 83% |

EXAMPLE 5

The beta zeolite catalyst of Example 2 (catalyst 1) and the beta zeolite catalyst of Example 3 (catalyst 2) were measured by IR and the FT-IR spectrum provided in FIG. 1. What is shown is that the Fe(OH) peak at 3680 cm$^{-1}$ for catalyst 2 which had the SAR of 10 yielded a significantly higher Fe(OH) peak than an essentially identical catalyst having a higher SAR. The peak at 3740 cm$^{-1}$ is SiOH and the peak indicated by a reference numeral 14 at approximately 3781 cm$^{-1}$ represents extra framework alumina formed by the treatment with the cerum salt.

EXAMPLE 6

Figure 3:
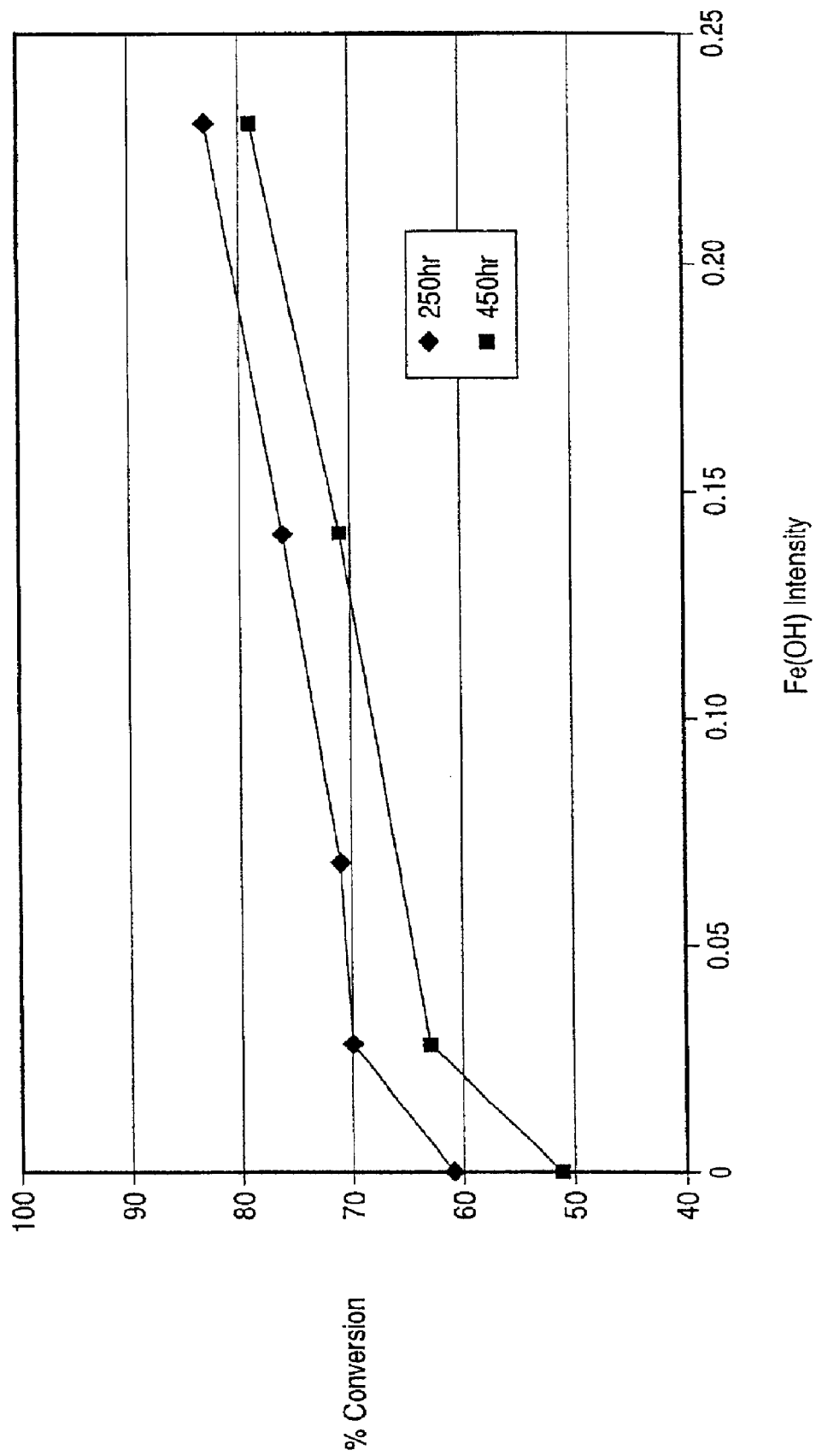
FIG. 3 is a graph representing the correlation between Fe(OH) peak intensity in IR and catalyst activity.

The catalysts of Examples 1, 2 and 3 were measured for $NO_x$ conversion at 250 hrs. of aging and 450 hrs. of aging. The results are shown in FIG. 3. FIG. 3 illustrates that the catalyst of Example 1, representing the absence of an Fe(OH) peak had the lowest $NO_x$ conversion. The catalyst which had the highest Fe(OH) peak provided the best $NO_x$ conversion at both heat aged conditions. Thus, what has been found is that the higher the Fe(OH) peak, the greater improvement in conversion even after significant heat aging of the catalyst.

Once given the above disclosure, many other features, modifications, and improvements will become apparent to the skilled artisan. Such other features, modifications, and improvements are, therefore, considered to be a part of this invention, the scope of which is to be determined by the following claims.

We claim:

1. A stabilized iron-promoted aluminosilicate zeolite beta catalyst having at least a portion of the iron in the form of Fe(OH).

2. The stabilized iron-promoted aluminosilicate zeolite beta of claim 1, wherein said iron promoter is present in amounts of 0.1 to 30 weight percent by weight calculated as metal and based on the total weight of the metal and the zeolite.

3. The stabilized iron-promoted aluminosilicate zeolite beta of claim 2, wherein said iron is present in the amounts of 0.5 to 2.5 weight percent based on metal.

4. The stabilized iron-promoted aluminosilicate zeolite beta of claim 1 having a Si/Al ratio of no more than 10.

5. The stabilized iron-promoted aluminosilicate zeolite of claim 1 further comprising a lanthanide.

6. The stabilized iron-promoted aluminosilicate zeolite of claim 5 wherein said lanthanide is cerium.

7. The stabilized iron-promoted aluminosilicate zeolite beta of claim 1, having an FT-IR absorption peak at 3680±5 cm$^{-1}$ and wherein said peak has a height of at least 0.02 absorbance unit.

8. The stabilized iron-promoted aluxninosilicate zeolite beta of claim 7, wherein said peak has a height of at least 0.10 absorbance unit.

9. The stabilized iron-promoted aluminosilicate zeolite beta of claim 8, wherein said peak has a height of at least 0.20 absorbance unit.

10. A stabilized iron-promoted aluminosilicate zeolite having FT-IR absorption peaks at 3680±5 cm$^{-1}$ and 3781±5 cm$^{-1}$.

11. The stabilized iron-promoted aluminosilicate zeolite of claim 10, wherein said zeolite has a silica to alumina mole ratio of at least about 8, and a pore structure which is interconnected in all three crystallographic dimensions by pores having an average kinetic pore diameter of at least about 7 Å.

12. The stabilized iron-promoted aluminosilicate zeolite of claim 11, wherein said zeolite is selected from the group consisting of ultra stable Y, beta and ZSM-20.

13. The stabilized iron-promoted aluminosilicate zeolite of claim 12, wherein said zeolite is zeolite beta.

14. The stabilized iron-promoted aluminosilicate zeolite of claim 13, wherein said zeolite beta has a Si/Al ratio of no more than 10.

15. The stabilized iron-promoted aluminosilicate zeolite of claim 13 further including a lanthanide.

16. The stabilized iron-promoted aluminosilicate zeolite of claim 15 wherein said lanthanide is cerium.

17. The stabilized iron-promoted aluminosilicate zeolite of claim 10, wherein said iron-promoter is present in amounts of 0.1 to 30% by weight calculated as metal and based on the total weight of the metal and the zeolite.

18. The stabilized iron-promoted aluminosilicate zeolite of claim 17, wherein said iron is present in amounts of 0.5 to 2.5 weight percent.

19. The stabilized iron-promoted aluminosilicate zeolite of claim 10, wherein said peak at 3680±5 cm$^{-1}$ has a height of at least 0.02 absorbance unit.

20. The stabilized iron-promoted aluminosilicate zeolite of claim 19, wherein said peak at 3680±5 cm$^{-1}$ has a height of at least 0.10 absorbance unit.

21. The stabilized iron-promoted aluminosilicate zeolite of claim 10, wherein said FT-IR absorption peak at 3781±5 cm$^{-1}$ has a peak height of at least 0.05 absorbance unit.

22. The stabilized iron-promoted aluminosilicate zeolite of claim 10 further containing alternating aluminum and oxygen atoms formed in a chain separate from framework atoms of said zeolite, said alternating aluminum and oxygen atoms of said chain comprising at least 10 weight percent of the total aluminum oxide in said zeolite.

23. The stabilized iron-promoted aluminosilicate zeolite of claim 22 comprising zeolite beta.

24. The stabilized iron-promoted aluminosilicate zeolite of claim 10 further including a lanthanide.

25. The stabilized iron-promoted aluminosilicate zeolite of claim 24 wherein said lanthanide is cerium.

26. A process for improving the stability of an iron-promoted aluminosilicate zeolite catalyst under oxidizing and/or hydrothermal conditions comprising treating an aluminosilicate zeolite having a reduced sodium content of less than 500 ppm sodium cations with an iron salt and calcining said catalyst under oxidizing conditions to form said iron-promoted zeolite catalyst wherein at least a portion of said iron is in the form of Fe(OH).

27. The process of claim 26, wherein said zeolite has a silica to alumina mole ratio of at least about 8, and a pore structure which is interconnected in all three crystallographic dimensions by pores having an average kinetic pore diameter of at least about 7 Å.

28. The process of claim 27, wherein said zeolite is selected from the group consisting of ultrastable Y, beta and ZSM-20.

29. The process of claim 28, wherein said zeolite is zeolite beta.

30. The process of claim 29, wherein said zeolite beta has a Si/Al ratio of 8 to 10.

31. The process of claim 26, wherein said zeolite having a reduced sodium content is formed by exchanging a sodium form of said zeolite with ammionium cations or hydrogen cations.

32. The process of claim 31, wherein said zeolite having a reduced sodium cation content is exchanged with hydrogen cations by treating a sodium form of said zeolite with an acid.

33. The process of claim 26, wherein said zeolite having a reduced sodium content also has a carbon content of no more than 500 ppm.

34. The process of claim 26, further comprising treating said zeolite so as to form extra-framework alumina chains associated with said zeolite.

35. The process of claim 34, wherein forming said chains comprises subsequent to treating said zeolite with said iron salt, treating said zeolite catalyst with steam at a temperature of 600°–800° C. for a period of time of 0.25 to 8 hours.

36. The process of claim 35, wherein the temperature of said steam is 650°–750° C. and the length of treatment is from 0.5 to 4 hours.

37. The process of claim 34, wherein said zeolite is selected from the group consisting of ultrastable Y, beta and ZSM-20.

38. The process of claim 37, wherein said zeolite is zeolite beta.

39. The process of claim 34, wherein said extra-framework alumina chains are provided by ion exchanging said low sodium content aluminosilicate zeolite with a lanthanide salt under acidic conditions insufficient to substantially dealuminate said zeolite and to provide a level of lanthanide of approximately 0.25 to 1 weight percent based on lanthanide on said zeolite.

40. The process of claim 39, wherein said lanthanide salt is a cerium salt.

41. The process of claim 39, wherein said zeolite is selected from the group consisting of ultrastable Y, beta and ZSM-20.

42. The process of claim 41, wherein said zeolite is zeolite beta.

43. The process of claim 42, wherein said zeolite beta has a Si/Al ratio of 8 to 10.

44. The process of claim 26, wherein said iron is added to said zeolite in amounts of from 0.1 to 30% by weight calculated as iron.

45. The process of claim 44, wherein the iron is present in the amounts of 0.5 to 2.5 weight percent as metal on said zeolite.

* * * * *